Dec. 26, 1950 R. D. BECK 2,535,829
APPARATUS FOR PREHEATING MOLDING POWDERS
Filed Sept. 16, 1946 2 Sheets-Sheet 1
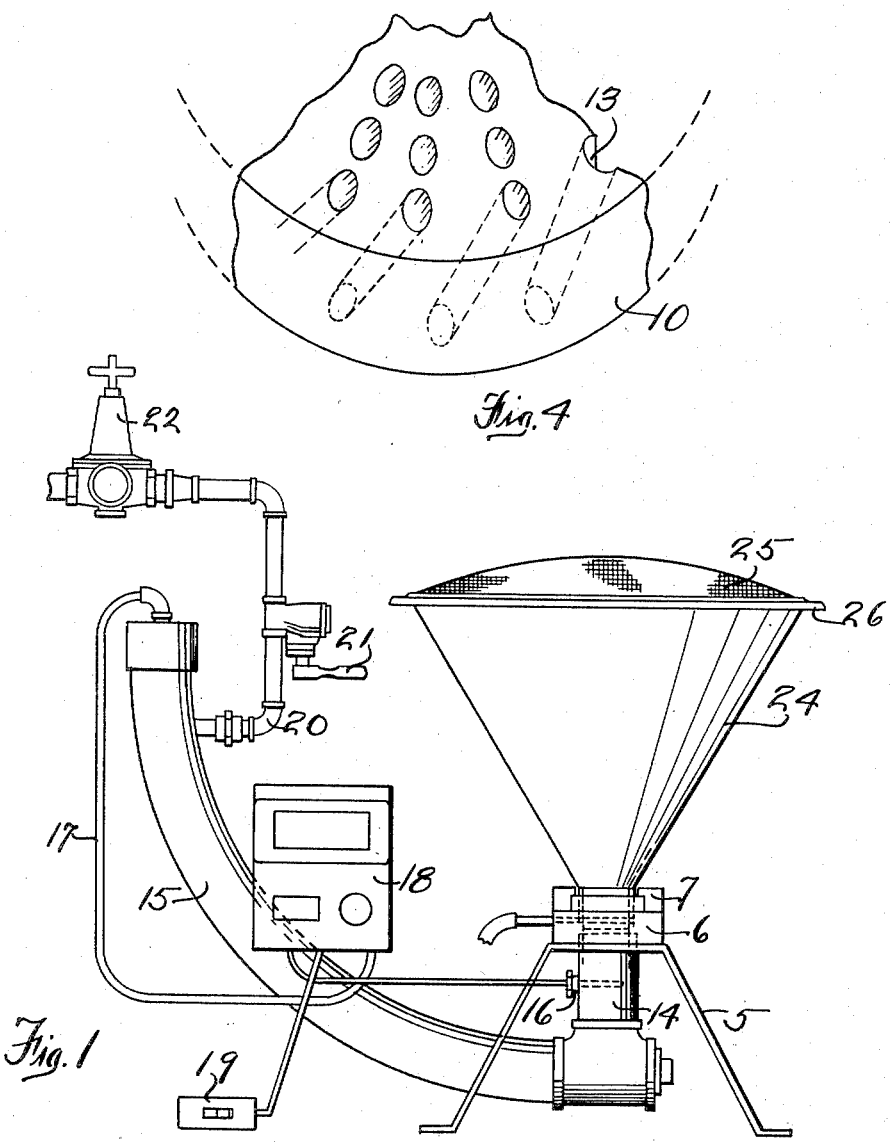
Ronald D. Beck, Inventor
By Mason, Porter, Diller & Stewart
Attorneys

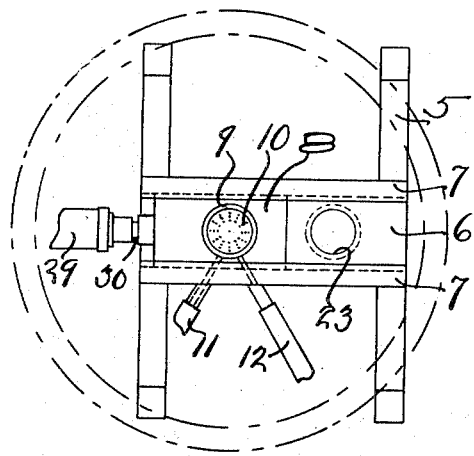
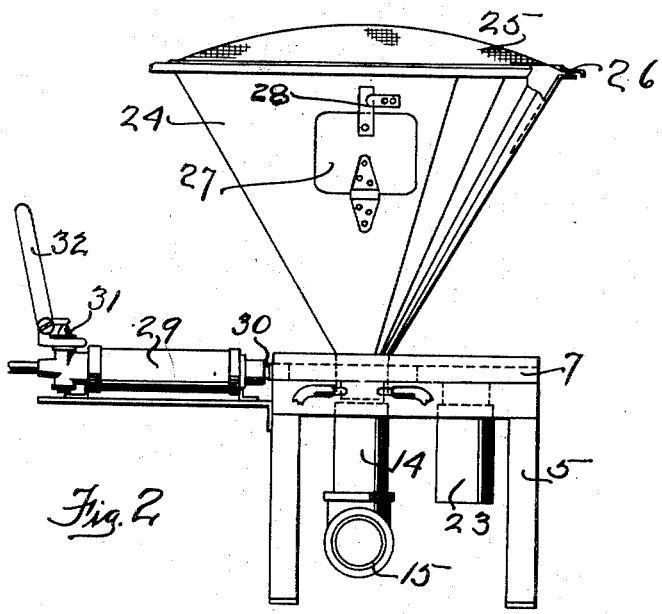

Patented Dec. 26, 1950

2,535,829

UNITED STATES PATENT OFFICE 2,535,829

APPARATUS FOR PREHEATING MOLDING POWDERS

Ronald D. Beck, Cambridge, Ohio, assignor to Continental Can Company, Inc., New York, N. Y., a corporation of New York Application September 16, 1946, Serial No. 697,391

1 Claim. (Cl. 34—57)

The invention of which the following is a specification relates to apparatus for preheating molding powders. The use of molding powders for the production of plastic articles in molding presses required close and accurate control over the material. Molding powders are definitely hygroscopic and unless thoroughly dry when placed in the mold, will produce undesirable irregularities in the finished articles. Frequently, the powders are made up in "pre-forms" as pellets, lozenges and like discrete forms. This facilitates storage and weighing. However, it increases the difficulty of removing absorbed moisture.

It is customary to preheat the plastic material whether in powder form or in the form of pellets and the like. This heating does not, however, accomplish uniform drying. There is also a serious problem in establishing uniform preheating through the mass. Due to the low conductivity of the material, heating progresses most rapidly at the surface and may reach a point where premature setting occurs before the interior of the mass can be heated and the material introduced into the molding press for final heating and shaping.

One of the objects of my invention is to effectively remove moisture down to a minimum of from 1.5 to 2% from thermosetting molding powder before it is introduced into the molding press.

Another object of my invention is to preheat the molding powder uniformly throughout, preliminary to its introduction into the press.

A still further object of my invention is to thus reduce the time and heating required to render the material plastic in the press.

At the same time an incidental object of my invention is to avoid overheating and possible premature setting of the outer portions of the powdered mass.

In carrying out my invention, I avoid the necessity of using "preforms" and the resultant inequality of uniform heating characteristic of electronic, induction or similar heat radiators.

Among the objects of my invention is also the control of the heat so that there will be a uniform supply.

Additionally, my invention insures that the molding powder will be maintained in a loose, buoyant form while it is being uniformly heated throughout.

My invention includes novel and improved facilities for carrying out the purposes above outlined. As illustrating the preferred method of carrying out my invention and the improved facilities incidental thereto, I have shown the preferred form in the accompanying drawings in which:

Fig. 1 is an end elevation of a machine suitable for carrying out my novel process.

Fig. 2 is a side elevation of the same;

Fig. 3 is a plan view of the machine with the funnel removed and

Fig. 4 is a fragmentary perspective view greatly enlarged of the plate through which the air jets pass.

For the purpose of illustrating my process of uniformly heating molding powders, I have shown a novel machine in which a charge of loose powders, previously weighed to conform to the capacity of the mold, is subjected to a swirling upwardly directed stream of heated air. In this way the powder is rendered buoyant and as the heated air passes upwardly, each powder particle is uniformly heated. The powder is lifted and scattered by the stream of heated air. It falls on the inclined inner surface of the funnel which forms the confining receptacle and then drops back into the stream of ascending heated air.

The air stream is formed as a hollow conical vortex with a quiescent vertical axis.

After the powder has been subjected to the desired amount of heat, the funnel is shifted rapidly to a position over a discharge port so that the loose and heated powder will then drop by gravity into an open cup for transfer to the molding press.

In the drawings I have shown a base 5 which may be rigidly mounted or affixed to a foundation. The top of the base carries a slide plate 6 which has a smooth horizontal upper surface.

Opposite sides of the slide plate have two rails 7, 7 projecting inwardly to provide a track which will serve to hold down a slidable carriage provided on the plate 6.

The slide carriage 8 is in the form of a flat block slidable between the rails 7, 7. The carriage has an opening 9 in the bottom.

The slide plate 6 has a vertical opening in the bottom in which is mounted a nozzle disk 10. This disk is formed of corrosion resisting metal or the like. The disk is suitably water jacketed and has an inlet 11 and outlet 12 for a supply of cooling water.

The disk 10 has a solid center surrounded by annular and concentric series of upwardly directed jet passageways 13. All of these passageways are directed in the same inclination circumferentially of the disk (see Fig. 4). This arrangement produces a plurality of jets of air which give a swirling motion to the powder when dropped above the disk. At the same time there is a tendency for the powder to spread laterally into the quiescent area above the solid center of the disk and also outwardly toward the walls of the containing chamber.

Beneath the nozzle disk 10 is a hot air inlet 14 which leads upwardly from an air heating manifold 15. The air inlet has a thermocouple 16 registering the temperature at which the air is delivered to the nozzle disk 10. The manifold 15 contains a series of heating elements such as electric resistance elements. These elements receive heating current through the conductor 17 leading from a current regulator 18. This, in turn, is controlled by a switch 19 from a suitable source of current.

A supply of compressed air is admitted through pipe 20, valve 21 and pressure regulator 22.

The slide plate has a discharge chute 23 spaced from the hot air inlet 14 and also between the rails 7, 7.

A funnel 24 is rigidly mounted on the slide carriage 8 and forms a retaining chamber for the material treated. This funnel has a screen mesh cover 25 held down by a ring 26. A loading door 27 is provided in the side wall of the funnel for the admission of successive measured charges of loose molding powder. This door is pivoted and has a latch 28.

Means are provided for rapidly shifting the carriage 8 together with the funnel 24 from a position above the air inlet 14 to the discharge chute 23 and vice versa. I have illustrated this as a reciprocating motor 29. This is a cylinder containing a reversible piston and having a piston rod 30 coupled to the carriage 8. A reversing air valve 31 and handle 32 permits instantaneous application of compressed air to either side of the piston. Other forms of mechanical or electric mechanism may be utilized for shifting the carriage from the heating position to the discharge position and back.

In like manner, other forms of heating the air may be substituted for the electric heating. Thus, the air may be passed through superheated radiators or may take the form of the exhaust from gases burned in the manifold 15.

The manifold 15 is maintained at the desired temperature by means of the current regulator 18 and the thermocouple 16. A charge of loose molding powder introduced through the door 27 drops to the base of the funnel over the disk 10. Valve 21 being opened, a stream of compressed air passes through the manifold 15 and is heated to the desired temperature. It is directed through the disk 10 in the form of an annular zone of inclined jets which lift the powder and maintain it in a turbulent diffused buoyant state.

The heat of the air is applied uniformly throughout the mass of loose powder.

Any residual moisture is immediately taken up in the air stream which rises through the screened cover of the funnel. At the same time the heat from the air jets is imparted to all particles of the powder. These particles are dispersed and may fall against the inclined wall of the funnel from which they slide back into the upwardly directed jets.

Heating is very rapid and as soon as the powder has reached the desired preheated condition, the air valve 31 is opened to apply pressure back of the piston. The piston rod 30 then shifts the carriage 8 quickly to a position above the discharge chute 23.

In this operation the discharge of heated air through the inlet 14 is cut off. The molding powder in dry and heated condition drops immediately through the discharge chute 23 into a filling cup for transfer to the molding press.

The air valve 31 is then reversed and the piston rod 30 reciprocates the carriage 8 to its original position above the air inlet 14. In the meantime, the compressed air valve 21 has been closed so that the loading door 27 may be opened and a fresh charge of powder admitted for drying and heating.

The above described process provides a ready and convenient method of uniformly drying and heating molding powder. The mechanism illustrated carries out the purposes outlined. It will be evident that the process may be carried out without depending upon the particular mechanism illustrated and that the latter may be varied in proportions and details without departing from the scope of the following claim:

What I claim is:

Means for uniformly heating loose molding powder comprising a horizontal plate, a pair of straight parallel rails thereon, an annular series of ducts in the plate inclined both vertically and horizontally around a common central point and means for directing heated air upwardly therethrough, a discharge passageway in the plate spaced from the air ducts, a slide carriage, a vertical passageway through the carriage, a funnel mounted over the passageway, a screen cover for the funnel, and means for reciprocating the carriage on the plate between the rails to register with the ducts and with the discharge passageway.

RONALD D. BECK.

REFERENCES CITED

The following references are of record in the file of this patent:

UNITED STATES PATENTS

| Number | Name | Date |
|---|---|---|
| 83,255 | Chichester | Oct. 20, 1868 |
| 748,893 | Trump | Jan. 5, 1904 |
| 748,894 | Trump | Jan. 5, 1904 |
| 1,434,193 | Braley | Oct. 31, 1922 |
| 1,459,326 | Dow | June 19, 1923 |
| 2,069,193 | Behr et al. | Jan. 26, 1937 |
| 2,288,613 | Dill | July 7, 1942 |
| 2,330,545 | Benoit | Sept. 28, 1943 |

FOREIGN PATENTS

| Number | Country | Date |
|---|---|---|
| 690,213 | France | June 16, 1930 |